US011018467B2

(12) United States Patent
Govindasamy et al.

(10) Patent No.: US 11,018,467 B2
(45) Date of Patent: May 25, 2021

(54) PLUG-IN NETWORK DEVICE WITH ADJUSTABLE POWER TONGS FOR PLUG ATTACHMENT

(71) Applicant: Extreme Networks, Inc., San Jose, CA (US)

(72) Inventors: Gururaj Govindasamy, San Ramon, CA (US); Alan Cuellar Amrod, Jupiter, FL (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 16/416,134

(22) Filed: May 17, 2019

(65) Prior Publication Data

US 2020/0021072 A1   Jan. 16, 2020

Related U.S. Application Data

(60) Provisional application No. 62/672,788, filed on May 17, 2018.

(51) Int. Cl.
*H01R 31/06* (2006.01)
*H04W 88/08* (2009.01)
*H01R 27/00* (2006.01)
*H01R 13/66* (2006.01)

(52) U.S. Cl.
CPC ....... *H01R 31/065* (2013.01); *H01R 13/6675* (2013.01); *H01R 27/00* (2013.01); *H04W 88/08* (2013.01); *H01R 2201/04* (2013.01); *H04B 2203/5445* (2013.01); *H04B 2203/5454* (2013.01)

(58) Field of Classification Search
None
See application file for complete search history.

(56) References Cited

U.S. PATENT DOCUMENTS

| 7,168,968 | B1 * | 1/2007 | Li | H01R 13/213 439/172 |
|---|---|---|---|---|
| 8,226,424 | B1 * | 7/2012 | Wang | H01R 31/06 439/172 |
| 8,790,124 | B2 * | 7/2014 | Lee | H01R 31/06 439/131 |
| 9,166,351 | B1 * | 10/2015 | Wang | H01R 24/66 |
| 2003/0228778 | A1 * | 12/2003 | Shang | H01R 27/00 439/172 |
| 2005/0136972 | A1 * | 6/2005 | Smith | H04B 3/542 455/554.1 |
| 2005/0176281 | A1 * | 8/2005 | Zhuge | H01R 13/6272 439/173 |
| 2007/0047182 | A1 * | 3/2007 | Hassend | H01R 13/6633 361/600 |

(Continued)

*Primary Examiner* — Oscar C Jimenez
(74) *Attorney, Agent, or Firm* — Sterne, Kessler, Goldstein & Fox P.L.L.C.

(57) ABSTRACT

A device with a plug attachment; a power plug extending from the plug attachment; adjustable power tongs; a fastening mechanism configured to fasten the power plug to the adjustable power tongs; a plug attachment cover operationally connected to the adjustable power tongs; electronic components coupled to the power plug through which power is provided from a power source to the electronic components, the electronic components causing the plug-in network device to function as a wireless access point (WAP).

18 Claims, 5 Drawing Sheets

(56) References Cited

U.S. PATENT DOCUMENTS

| | | | | |
|---|---|---|---|---|
| 2007/0066111 | A1* | 3/2007 | Liang | H01R 13/22 |
| | | | | 439/217 |
| 2007/0197262 | A1* | 8/2007 | Smith | H04B 3/542 |
| | | | | 455/562.1 |
| 2009/0117765 | A1* | 5/2009 | Wen | H01R 27/00 |
| | | | | 439/166 |
| 2010/0291786 | A1* | 11/2010 | Hopwood | H01R 13/6273 |
| | | | | 439/345 |
| 2011/0298301 | A1* | 12/2011 | Wong | H04L 12/2827 |
| | | | | 307/116 |
| 2011/0320636 | A1* | 12/2011 | Young | H04W 88/16 |
| | | | | 709/249 |
| 2013/0183854 | A1* | 7/2013 | Huang | H01R 31/06 |
| | | | | 439/534 |
| 2015/0064955 | A1* | 3/2015 | Liu | H01R 24/68 |
| | | | | 439/344 |
| 2016/0044447 | A1* | 2/2016 | Tetreault | G01K 1/024 |
| | | | | 455/41.1 |
| 2017/0244206 | A1* | 8/2017 | Jiang | H01R 13/5219 |
| 2018/0124903 | A1* | 5/2018 | Strods | H05B 47/105 |
| 2019/0372203 | A1* | 12/2019 | Su | H01Q 1/02 |

* cited by examiner

PLUG-IN NETWORK DEVICE WITH ADJUSTABLE POWER TONGS FOR PLUG ATTACHMENT

CROSS-REFERENCE TO RELATED APPLICATIONS

The present application claims priority to U.S. Provisional Patent Application Ser. No. 62/672,788 filed May 17, 2018 and entitled "Plug-in Network Device with Adjustable Power Tongs for Plug Attachment," which is hereby incorporated by reference herein.

BRIEF DESCRIPTION OF THE DRAWINGS

FIGS. 3B-3D depict examples of an attachment process of the plug-in network device with adjustable power tongs.

DETAILED DESCRIPTION

Figure 1:
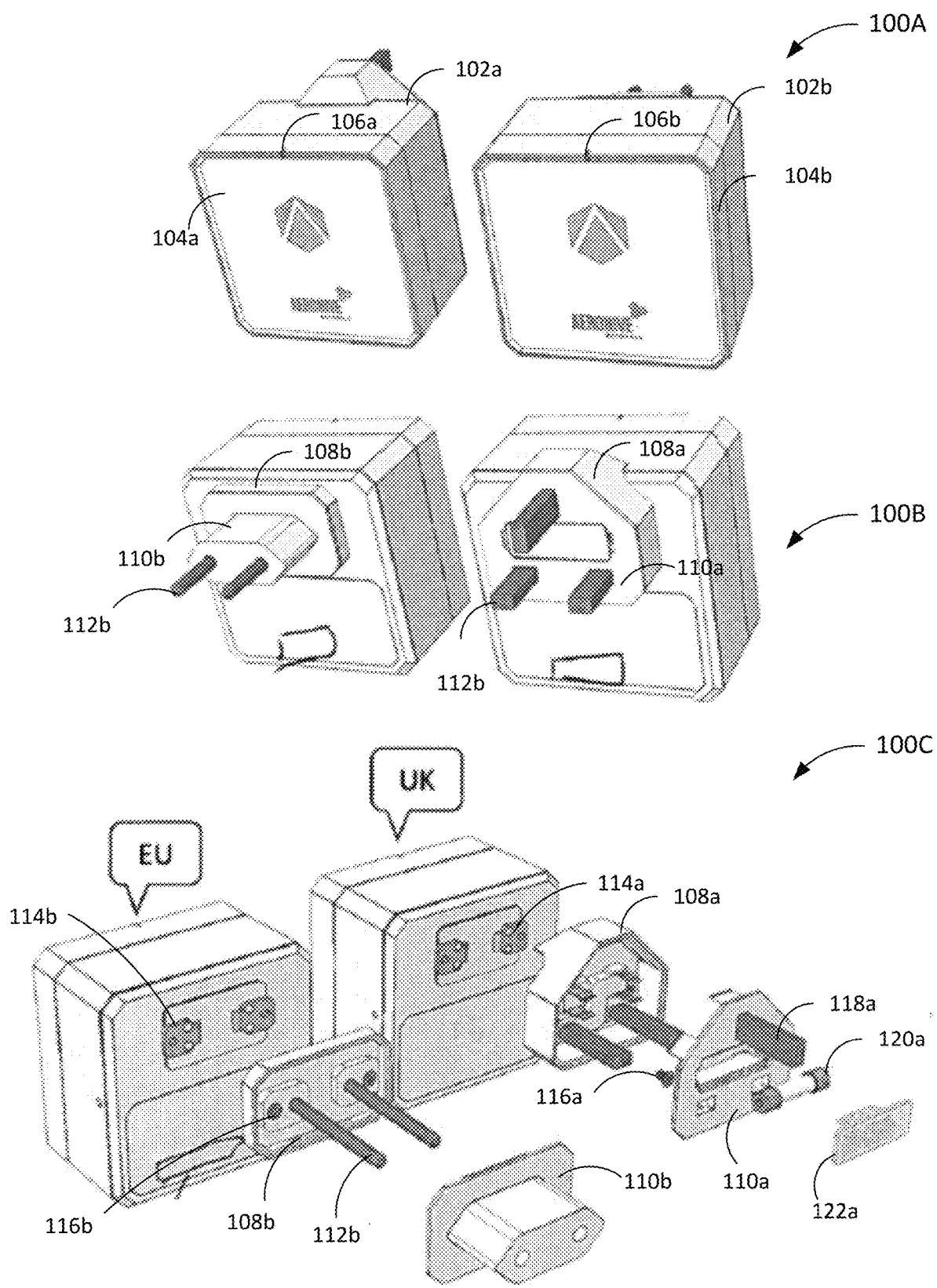
FIG. 1 depicts diagrams to show perspective views and exploded views of examples of a plug-in network device with adjustable power tongs.

FIG. 1 depicts diagram 100A, 100B, and 100C (collectively, the "diagrams 100") of an example of plug-in network devices with adjustable power tongs. While a network device may be capable of functioning on a number of different networks, for illustrative utility in this paper, the network devices are assumed, unless otherwise indicated, to operate on an enterprise network and can therefore be characterized as a network device of the relevant enterprise network. Depending upon requirements, preferences, or other factors the network devices can be implemented as an access point (AP), gateway, router, bridge, switch, or some other applicable network device on the enterprise network. A network device can be implemented as a wireless AP (WAP) that operates in accordance with proprietary or standardized protocols.

The diagram 100A shows a front side of two plug-in network devices configured for use in the United Kingdom (UK) and the European Union (EU), respectively, in left and right, respectively, and the diagram 100B shows a rear side of the plug-in network devices in right and left, respectively. The diagram 100C shows an exploded view of the two plug-in network devices in right and left. Hereinafter, unless otherwise specified, corresponding components of the two plug-in network devices are collectively described. Depending on a specific implementation, the structure and functionality of the corresponding components may be the same or different. Further, elements numbered with "a" in FIG. 1 and the subsequent figures are intended to be components for a plug-in network device for use in the UK, and elements numbered with "b" in FIG. 1 and the subsequent figures are intended to be components for a plug-in network device for use in the EU.

The diagrams 100 include rear housings 102a and 102b (representatively, the "rear housing 102"), front housings 104a and 104b (representatively, the front housing "104") connected to the corresponding rear housing 102, status indicators 106a and 106b (representatively, the "status indicator 106") on an upper portion of the front housing 104, plug attachments 108a and 108b (representatively, the "plug attachment 108"), plug attachment covers 110a and 110b (representatively, the "plug attachment cover 110"), alternating current (AC) power plugs 112a and 112b (representatively, the "AC power plugs 112") extending from the corresponding plug attachment 108, adjustable power tongs 114a and 114b (representatively, the "adjustable power tongs 114"), and fastening mechanisms 116a and 116b (representatively, the "fastening mechanism 116") to fasten the corresponding plug attachment 108 to the corresponding rear housing 102.

In the example of FIG. 1, the rear housing 102 is intended to represent a part of a housing of the plug-in network device on a side (rear side) that is intended to face a wall (or ceiling, floor, etc.) with an AC power socket. In a specific implementation, electronic components to cause the plug-in network device to function as a WAP are accommodated in the rear housing 102. In such an implementation, the plug-in network device can be characterized as a plug-in WAP. Specific electronic components of a plug-in network device are described in U.S. Provisional Patent Application Ser. No. 62/641,946 filed Mar. 12, 2018, which is hereby incorporated by reference herein.

In a specific implementation, the rear housing 102 includes an engagement mechanism (not shown in FIG. 1) to be engaged with the front housing 104. Depending on a specific implementation, the engagement mechanism may include a latch structure to removably fix the front housing 104 to the rear housing 102. The engagement mechanism may or may not include one or more engagement surfaces that are configured to be flush with one or more engagement surfaces of the front housing 104. For example, the rear housing 102 may include a male or female engagement mechanism that is coupled to a female or male engagement mechanism of the front housing 104.

In the example of FIG. 1, the front housing 104 is intended to represent a part of a housing of the plug-in network device on a side (front side) that is intended to face away from a wall with an AC power socket. In a specific implementation, electronic components to cause the plug-in network device to function as a WAP are accommodated in the front housing 104. (The electronic components can also be distributed between the front housing 104 and the rear housing 102.)

The rear housing 102 and the front housing 104 have a shape suitable for coupling to an AC power socket on a wall (or ceiling, floor, etc.). For example, the rear housing 102 can be formed in a substantially cuboid shape with a square front and rear face where the length of each side of the square is 50-80 mm (e.g., 72 mm), and rectangular sides with a width of about 20-45 mm (e.g., 42 mm) measured across both the rear housing 102 and the front housing 104 when the plug-in network device is assembled. The rear housing 102 and the front housing 104 are formed of applicable materials to be safe and sturdy enough for affixing to a wall. For example, the rear housing 102 and the front housing 104 can be formed of dielectric materials such as resin and/or conductive materials such as metal. In a specific implementation, the plug-in network device has a weight that is suitable to affix to a wall. For example, in a specific implementation, the plug-in network device weighs 100-300 g.

In the example of FIG. 1, the status indicator 106 is intended to represent an indicator, such as a light-emitting diode (LED) formed in the front housing 104. In a specific implementation, the status indicator 106 is configured to indicate an operational and/or connection state of the plug-in network device. The status indicator 106 may be configured to indicate different status depending upon flash pattern or color. For example, a green light might indicate the plug-in network device has sufficient power, while a red light might indicate the plug-in network device is not receiving adequate power (e.g., when the plug-in network device is accidentally unplugged). As another example, a green light might indicate a link has been established with another network device and a flashing green light might indicate the link has been established, but the plug-in network device is not receiving adequate power. The status indicator 106 can also be implemented using multiple distinct indicators, such as three LEDs in a row that indicate different status (e.g., one for power, one for configuration, and one for link status). Depending upon implementation- and/or configuration-specific factors, the status indicator 106 can be augmented with audio, which may or may not also include forming openings in the rear housing 102 or the front housing 104. Depending on a specific implementation, the audio signals may include a beep sound and/or a human voice announcement, such as "please plug me back in" or "the fire alarm has been triggered on the third floor."

In the example of FIG. 1, the plug attachment 108 is intended to represent an attachment for electrical connection between a main body of the plug-in network device defined by the rear housing 102 and the front housing 104, and an external power source. The plug attachment 108 is configured for use in a specific geographic region adopting a specific plug type. As shown in the diagrams 100, the plug attachment 108*a* is intended to be used in the UK, and the plug attachment 108*b* is intended to be used in the EU. Although these two geographic regions are exemplified, the plug attachment 108 can be configured for any applicable geographic region, including the US, Australia, China, etc.

Specifically, the plug attachment 108*a* is formed so as to partially extend out of the contour of the rear housing 102*a* when viewed from a front side of the plug-in network device, such that a larger space can be created therein for accommodating components. A thickness of the plug attachment 108*a* (e.g., 2-8 mm) is smaller than a thickness of the main body, such that the main body will not be excessively apart from a receptacle (e.g., wall receptacle). The plug attachment 108*a* has an inner recessed space defined by edges of the plug attachment 108*a*, and the AC power plugs 112*a* and the fastening mechanism 116*a* are coupled to portions of the plug attachment 108*a* in the inner recessed space.

Specifically, the plug attachment 108*b* is formed to be within a rear surface of the rear housing 102*b*, such that the plug attachment 108*b* is hidden behind the rear housing 102*b* when viewed from a front side of the plug-in network device. A thickness of the plug attachment 108*b* (e.g., 1-3 mm) is smaller than a thickness of the main body, such that the main body will not be excessively apart from a receptacle (e.g., wall receptacle). More particularly, the thickness of the plug attachment 108*b* may be smaller than a thickness of the rear housing 102*b* and/or the front housing 104*b*. The plug attachment 108*b* has an inner recessed space defined by edges of the plug attachment 108*b*, and the AC power plugs 112*b* and the fastening mechanism 116*b* are coupled to portions of the plug attachment 108*b* in the inner recessed space.

In the example of FIG. 1, the plug attachment cover 110 is intended to represent a component to cover the plug attachment 108, in particular, at least part of the inner recessed space of the plug attachment 108. The plug attachment cover 110 has slots through which the AC power plugs 112 extend, and part of the AC power plugs 112 are uncovered by the plug attachment cover 110 and exposed for electrical connection with receptacles. In a specific implementation, the plug attachment 108 and the plug attachment cover 110 define outer surfaces of an attachment unit to be attached to the main body of the plug-in network device. The plug attachment 108 and the plug attachment cover 110 are formed of applicable materials to be safe and sturdy enough for affixing to the main body. For example, the plug attachment 108 and the plug attachment cover 110 can be formed of dielectric materials such as resin and/or conductive materials such as metal. Specifically, the plug attachment cover 110*a* includes an earth terminal fixed to the plug attachment cover 110*a*, a recessed portion in which a fuse 120*a* is embedded, and a fuse cover 122*a* to cover the recessed portion to conceal the fuse 120*a*.

In a specific implementation, the plug attachment 108 includes an engagement mechanism (not shown in FIG. 1) to be engaged with the plug attachment cover 110. Depending on a specific implementation, the engagement mechanism may include a latch structure to removably fix the plug attachment cover 110 to the plug attachment 108. The engagement mechanism may or may not include one or more engagement surfaces that are configured to be flush with one or more engagement surfaces of the plug attachment 108. For example, the plug attachment 108 may include a male or female engagement mechanism that is coupled to a female or male engagement mechanism of the plug attachment cover 110.

In the example of FIG. 1, the plug attachment 108 has slots formed in the inner recessed portion surface to allow the AC power plugs 112 to extend therefrom. The AC power plugs 112 could extend from some other applicable portion of the plug attachment 108 than is depicted. The AC power plugs 112 are intended to represent a male portion of a domestic or light commercial electrical connector. Depending on a country to be used, the shape of the AC power plugs 112 may vary. It may be desirable to include multiple power sources, such as the AC power plugs 112 and an internal battery so that if the plug-in network device is accidentally or unintentionally unplugged, the internal battery can allow the plug-in network device to continue to operate (presumably, in this example, until it is plugged back in).

The AC power plugs 112 are for AC power because AC power is suitable for some common use cases, such as domestic and light commercial applications, and specifically because the AC power plugs 112 can be plugged into ubiquitous wall sockets found in domestic and light commercial locations. Alternatively, the AC power plugs 112 could be replaced with an industrial or multiphase plug and/or a direct current (DC) plug for use as a small coaxial connector, snap and lock DC power connectors, outdoor light systems connectors, airline in-seat power supply systems, powerpole connectors, SAE connectors, cigar lighter plugs, to name several. Instead or in addition to the AC power plugs 112, the plug-in network device can include a LAN slot for connection with a wired communication device, a universal serial bus (USB) of applicable versions (e.g., Type-A, Type-B, Type-C, USB 2.0, USB 3.0, USB 3.1, USB 3.2, mini/micro USB, etc.) for data communication and/or power supply/charging, or some other applicable connector that can provide data, power, or both. Some of these alternatives or additions may be more conveniently located on the front housing 104 than the rear housing 102.

In the example of FIG. 1, the adjustable power tongs 114 are intended to represent an electrical interface of the main body of the plug-in network device for connection with the AC power plugs 112. The adjustable power tongs 114 extend out of the rear housing 102 backward and bent such that the extending portions of the adjustable power tongs 114 are aligned along a rear surface of the rear housing 102. Depending upon implementation- and/or configuration-specific factors, the direction in which each of the extending portions of the adjustable power tongs 114 is bent may be the outward direction as in FIG. 1, an inward direction, or any other applicable directions. In a specific implementation, the extending portions of the adjustable power tongs 114 are accommodated in a recessed portion of the plug attachment 108 formed on a surface facing the rear housing 102, such that the extending portions of the adjustable power tongs 114 are fully accommodated within the plug attachment 108 in a thickness direction thereof. Each of the pair of the adjustable power tongs 114 has a mechanism (e.g., hole) to be coupled to the fastening mechanism 116.

In a specific implementation, the adjustable power tongs 114 are shaped originally configured to be at least partially compatible as an electric plug in a certain region, such as the US, before the adjustable power tongs 114 are bent. For example, the two portions of the adjustable power tongs 114 are spaced apart from each other with the standard distance for US electric plugs. In another example, the thickness of the two portions of the adjustable power tongs 114 are the standard thickness for US electric plugs. In a specific implementation, when the adjustable power tongs 114 are shaped at least partially compatible as an electric plug in a certain region, a back panel of the rear housing 102 from which the adjustable power tongs 114 extend may have the same configuration as a back panel of a rear housing for the region. For example, slots formed in a back panel from which the adjustable power tongs 114 penetrate may have the same configuration as slots formed in a back panel for the region.

In the example of FIG. 1, the fastening mechanism 116 is intended to represent an element to mechanically couple the plug attachment 108 to the rear housing 102, and also electrically couple the AC power plugs 112 to the adjustable power tongs 114. Depending upon implementation- and/or configuration-specific factors, the fastening mechanism 116 may employ any applicable mechanism. For example, the fastening mechanism 116 includes a screw formed of a conductive material (e.g., metal). In that case, when assembling, a screw may be inserted into a hole formed in the plug attachment 108 and screwed into a hole formed in one of the pair of adjustable power tongs 114. The screw could be at least partially dug into the rear housing 102. In another example, the fastening mechanism 116 includes a conductive pin with a latch structure to couple with a corresponding adjustable power tong 114. In a specific implementation, the fastening mechanism 116 is intended to permanently couple the plug attachment 108 to the rear housing 102, such that the plug-in network device as a whole is intended to be used in a specific geographic region. In such a case, the fastening mechanism 116 may be irreversibly fixed to the plug attachment 108 and/or the corresponding adjustable power tong 114.

Advantageously, according to the plug-in network device described above, components for a specific region can be employed for another specific region, without substantially changing configuration thereof. In addition, since components for a specific region can be employed for another specific region, there may be no need to obtain a safety certification of the plug-in network device from applicable regulatory entities, such as Occupational Safety and Health Administration (OSHA), American National Standards Institute (ANSI), Underwriters Laboratories (UL), and National Fire Protection Association (NFPA). Further, since the adjustable power tongs 114 are bent and the plug attachment 108 is coupled to the bent adjustable power tongs 114, the plug attachment 108 for a specific region can be attached to the main body of the plug-in network device without excessively protruding out of the main body. Moreover, since the main body of the plug-in network device can be located sufficiently close to a female receptacle on a wall, it is possible to prevent the main body from pulling the AC power plugs 112 out of the female receptacle by its weight.

Figure 2:
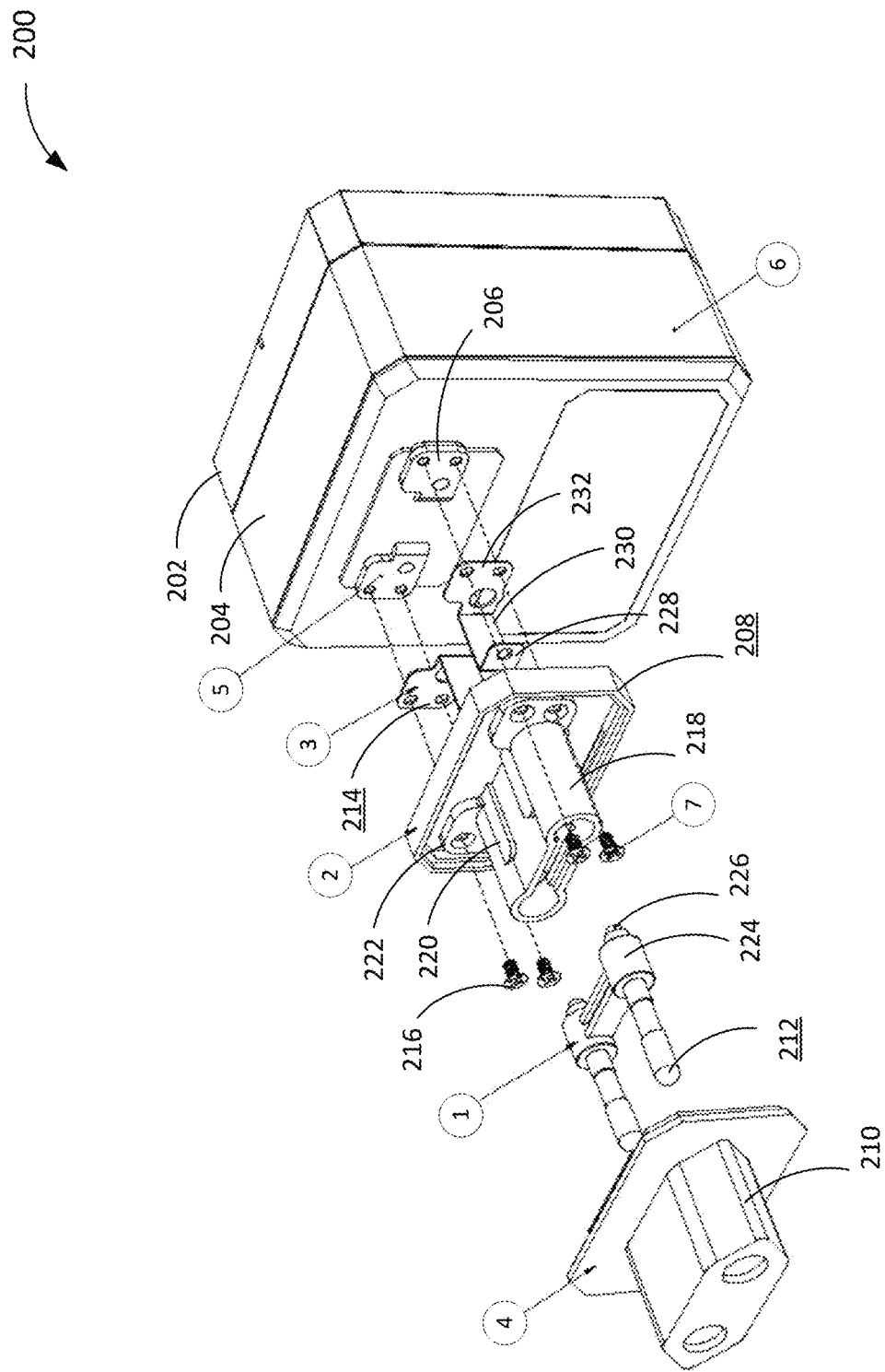
FIG. 2 depicts a diagram to show an exploded view and an assembly process of another example of a plug-in network device with adjustable power tongs.

FIG. 2 depicts a diagram 200 to show an exploded view and an assembly process of another example of a plug-in network device with adjustable power tongs. The diagram 200 includes a rear housing 202, a front housing 204 connected to the rear housing 202, a pair of adjustable power tongs 206, a plug attachment 208, a plug attachment cover 210, a pair of AC power plugs 212, a pair of plug contacts 214, and fastening mechanisms 216. In the example of FIG. 2, the rear housing 202 and the front housing 204 are configured in the same or similar manner as the rear housing 102 and the front housing 104 depicted in FIG. 1, and detailed descriptions thereof are omitted. Also, the adjustable power tongs 206, the plug attachment 208, the plug attachment cover 210, the AC power plugs 212, and the fastening mechanisms 216 have substantially the same or similar configuration as the adjustable power tongs 114, the plug attachment 108, the plug attachment cover 110, the AC power plugs 112, and the fastening mechanisms 116 depicted in FIG. 1, respectively, and features different from those in FIG. 1 are mainly discussed below.

In the example of FIG. 2, the plug attachment 208 includes a pair of plug housing portions 218, a pair of first plug contact housing portions 220, and a pair of second plug contact housing portions 222. The plug housing portion 218 is intended to represent a portion of the plug attachment 208 in which the AC power plugs 212 are accommodated. In a specific implementation, an inner space of the plug housing portion 218 is formed substantially the same or similarly to the shape of the AC power plugs 212, such that the AC power plugs 212 can be inserted from an opening of the plug housing portion 218. The first plug contact housing portion 220 is intended to represent a portion of the plug attachment 208 in which an extended part (e.g., a first part 228 and a second part 230) of the plug contact 214 is accommodated. In a specific implementation, an inner space of the first plug contact housing portions 220 is formed substantially the same or similarly to the shape of the extended part of the plug contact 214, such that the extended part can be inserted from an opening of the plug housing portion 218. The second plug contact housing portion 222 is intended to represent a portion of the plug attachment 208 in which a base part (e.g., the third part 232) of the plug contact 214 and the adjustable power tong 206 are accommodated. In a specific implementation, a single non-partitioned space may be formed by the internal space of the pair of plug housing portions 218, the pair of first plug contact housing portions 220, and the pair of second plug contact housing portions 222.

In the example of FIG. 2, the AC power plugs 212 include a plug coupler 224 and a pair of plug terminals 226. The plug coupler 224 is intended to represent a member to couple the pair of conductive plugs to each other. The plug coupler 224 includes a bridge portion connecting the pair of conductive plugs, and the bridge portion is formed to maintain electrical isolation between the conductive plugs. The plug terminal 226 includes an exposed conductive portion to be electrically coupled to the extended part of the plug contact 214. In a specific implementation, the plug coupler 224 includes a pair of holes through which the conductive plugs penetrate, respectively, to be formed as a single component.

In the example of FIG. 2, the plug contacts 214 are intended to represent a conductive component to electrically couple the AC power plugs 212 to the adjustable power tongs 206, respectively. In the example of FIG. 2, the plug contact 214 includes the first portion 228, the second portion 230, and the third portion 232. The first portion 228 is provided to be physically in contact with the plug terminal 226. In a specific implementation, the first portion 228 includes an opening in which the plug terminal 226 is fit as shown in FIG. 2. The second portion 230 is provided to mechanically and electrically connect between the first portion 228 and the third portion 232. The third portion 232 is provided to be physically in contact with the adjustable power tong 206. In a specific implementation, the third portion 232 has substantially the same footprint as that of the adjustable power tong 206.

The second plug contact housing portion 222 of the plug attachment 208, the third portion 232 of the plug contact 214, and the adjustable power tong 206 have one or more holes through which one or more pieces of the fastening mechanism 216 passes through to couple the plug attachment 208, the plug contact 214, and the adjustable power tong 206.

In an example of an assembly process of the plug-in network device depicted in FIG. 2, a part 2 corresponding to the plug attachment 208 (which may or may not have internal space) is overmolded onto a part 1 (corresponding to the AC power plugs 212). Then, in an example of an assembly of the plug-in network device depicted in FIG. 2, a part 3 (corresponding to the plug contact 214) is inserted into the unit of the part 1 and the part 2, such that the first portions 228 of the plug contacts 214 are coupled to the plug terminals 226 of the AC power plugs 212 (e.g., with rivets). Then, in an example of an assembly of the plug-in network device depicted in FIG. 2, the unit including the parts 1, 2, and 3, is positioned to align with a part 5 (corresponding to the adjustable power tongs 206), which is coupled to a part 6 (corresponding to the rear housing 202). Then, in an example of an assembly of the plug-in network device depicted in FIG. 2, parts 7 (corresponding to the fastening mechanisms 216) are inserted through holes formed in the parts 2, 3, and 5, and coupled to the part 5. Then, in an example of an assembly of the plug-in network device depicted in FIG. 2, a part 4 (corresponding to the plug attachment cover 210) is snapped onto the unit including the parts 1-3 and 5-7, to complete assembly of the plug-in network device.

FIGS. 3A-3D depict diagrams 300A-300D (collectively, the "diagrams 300") to show exploded views and an assembly process of other examples of a plug-in network device with adjustable power tongs. The diagram 300A shows an exploded view of a main body of the plug-in network device, and type-specific plug attachment of two types (for the UK and the EU), and diagrams 300B, 300C and 300D show an attachment process of the plug-in network device.

Figure 3A:
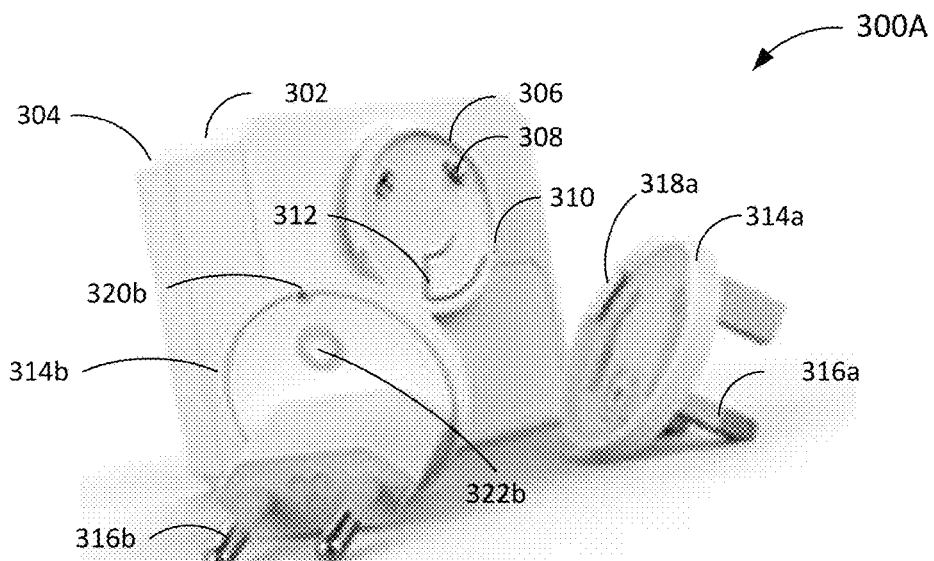
FIGS. 3A-3D depict diagrams to show exploded views.

The diagrams 300 include a rear housing 302, a front housing 304 connected to the rear housing 302, a first fastening mechanism 306, a pair of adjustable power tongs 308, a first alignment mark 310, a latch mechanism 312, detachable plug attachments 314a and 314b (representatively, the "detachable plug attachment 314"), AC power plugs 316a and 316b (representatively, the "AC power plugs 316"), a second fastening mechanism 318a, a second alignment mark 320b, and a detachment button 322b. It is noted that a second fastening mechanism on the detachable plug attachment 314b, a second alignment mark on the detachable plug attachment 314a, and a detachment button on the detachable plug attachment 314a are not depicted in the diagrams 300. Hereinafter, those and corresponding mechanisms depicted in the diagrams 300 are representatively referred to as a second fastening mechanism 318, a second alignment mark 320, and a detachment button 322, respectively. In the example of FIG. 3A, the rear housing 302 and the front housing 304 are configured in the same or similar manner as the rear housing 102 and the front housing 104 depicted in FIG. 1, and detailed descriptions thereof are omitted. Also, the adjustable power tongs 308, the detachable plug attachment 314, and the AC power plugs 316 correspond to the adjustable power tongs 114, the plug attachment 108, and the AC power plugs 112 depicted in FIG. 1, and features different from those in FIG. 1 are mainly discussed below.

In the example of FIG. 3A, the first fastening mechanism 306 is intended to represent a mechanism to mechanically couple with a type-specific plug attachment, in particular, the second fastening mechanism 318 thereof. The first fastening mechanism 306 includes a circular protrusion protruding from a rear surface of the rear housing 302 and one or more claws intermittently formed around a side surface of the circular protrusion. When one or more claws formed on the second fastening mechanism are positioned at locations different from those of the one or more claws formed on the first fastening mechanism 306, the detachable plug attachment 314 is allowed to be moved toward the rear housing 302. By rotating the detachable plug attachment 314 after moving toward the rear housing 302, the detachable plug attachment 314 can be detachably fixed to the rear housing 302.

In the example of FIG. 3A, the adjustable power tongs 308 are intended to represent an electrical interface of the main body of the plug-in network device for connection with the AC power plugs 316. The adjustable power tongs 308 extend out of the rear housing 102 backward and each of the adjustable power tongs 308 has a round shape, such that the adjustable power tongs 308 have smooth contact with contact surfaces (not shown) formed on the detachable plug attachment 314, while the detachable plug attachment 314 is being rotated. Depending upon implementation- and/or configuration-specific factors, the adjustable power tongs 308 may include a spring mechanism to allow the exposed portion of the adjustable power tongs 308 to be pressed towards the rear housing 302, thereby allowing further smooth contact with the contact surfaces of the detachable plug attachment 314.

In the example of FIG. 3A, the first alignment mark 310 is intended to represent a mark to show an insert angle of the detachable plug attachment 314, when the detachable plug attachment 314 is rotated to be fixed to the rear housing 302. When a rotational position of the second alignment mark 320 matches that of the first alignment mark 310, it indicates the detachable plug attachment 314 is at a proper position to be allowed to move toward the rear housing 302 for engagement therewith. When the second alignment mark 320 is moved to a certain position (e.g., 6 o'clock position in FIG. 3A), it indicates that the detachable plug attachment 314 is moved to an end position for engagement with the rear housing 302.

In the example of FIG. 3A, the latch mechanism 312 is intended to represent a mechanism to lock (restrict) rotation of the detachable plug attachment 314 when the plug attachment is at the end position for engagement with the rear housing 302. The latch mechanism 312 slightly protrudes above a rear surface of the rear housing 302, and is configured to fit with an engagement mechanism (not shown) formed on the detachable plug attachment 314. Depending upon implementation- and/or configuration-specific factors, the latch mechanism 312 may generate a unique sound (e.g., a click sound) when the detachable plug attachment 314 is rotated to the end position for engagement with the rear housing 302.

In the example of FIG. 3A, the detachable plug attachment 314 is intended to represent an attachment for electrical connection between a main body of the plug-in network device and an external power source. The detachable plug attachment 314 is intended to be detached and replaced with another detachable plug attachment for use depending on different regions employing different electrical plug types. In a specific implementation, the AC power plugs 316, the second fastening mechanism, the second alignment mark, and the detachment button are fixed to the detachable plug attachment 314, and those serve as a single component.

In the example of FIG. 3A, the detachment button 322 is intended to represent a mechanism to release lock of the rotation of the detachable plug attachment 314, caused by engagement of the latch mechanism 312 with an engagement mechanism (not shown in FIG. 3A) formed on the detachable plug attachment 314. The detachment button 322 can be pushed toward the rear housing 302, and while the detachment button 322 is being pushed, the detachable plug attachment 314 is allowed to be rotated for detachment.

Figure 3B:
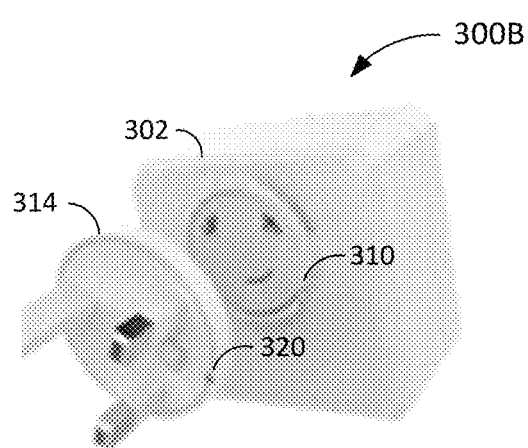
Figure 3D:
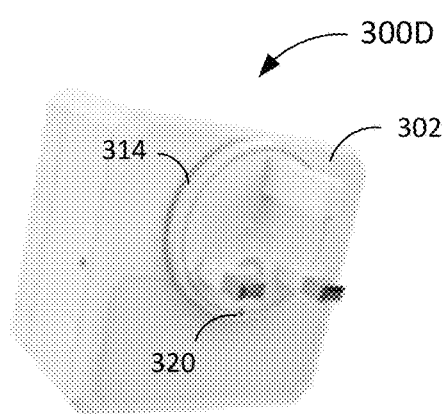
Figure 3C:
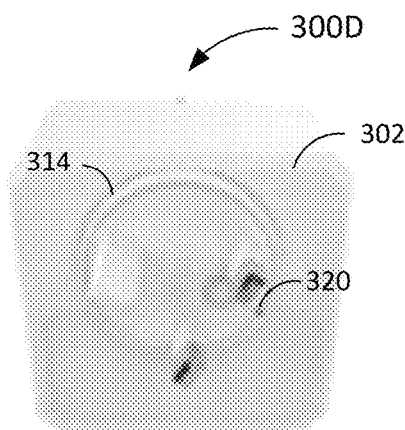

FIGS. 3B-3D depict an example of an attachment process of the plug-in network device. In FIG. 3B, the detachable plug attachment 314 is positioned such that the second alignment mark 320 thereof is at the first alignment mark 310 of the rear housing 302. Then, in FIG. 3C, the detachable plug attachment 314 is moved toward the rear housing 302, such that an edge of the detachable plug attachment 314 contacts the rear surface of the rear housing 302. Then, in FIG. 3D, the detachable plug attachment 314 is rotated in a clockwise direction until the latch mechanism 312 locks rotation of the detachable plug attachment 314 in a counterclockwise direction. As a result, the attachment of the detachable plug attachment 314 is completed. At this time, a click sound may be generated, to indicate that the attachment of the detachable plug attachment 314 is completed.

In an example of a detachment process of the plug-in network device depicted in FIG. 3D, the detachable plug attachment 314 is rotated in a counterclockwise direction, while the detachment button 322 is being pushed (at least until the lock of the rotation by the latch mechanism 312 is released). Then, in an example of a detachment process of the plug-in network device depicted in FIG. 3D, when the second alignment mark 320 is at the same position as the first alignment mark 310, the detachable plug attachment 314 is moved apart from the rear housing 302, to complete detachment of the detachable plug attachment 314.

Figure 4:
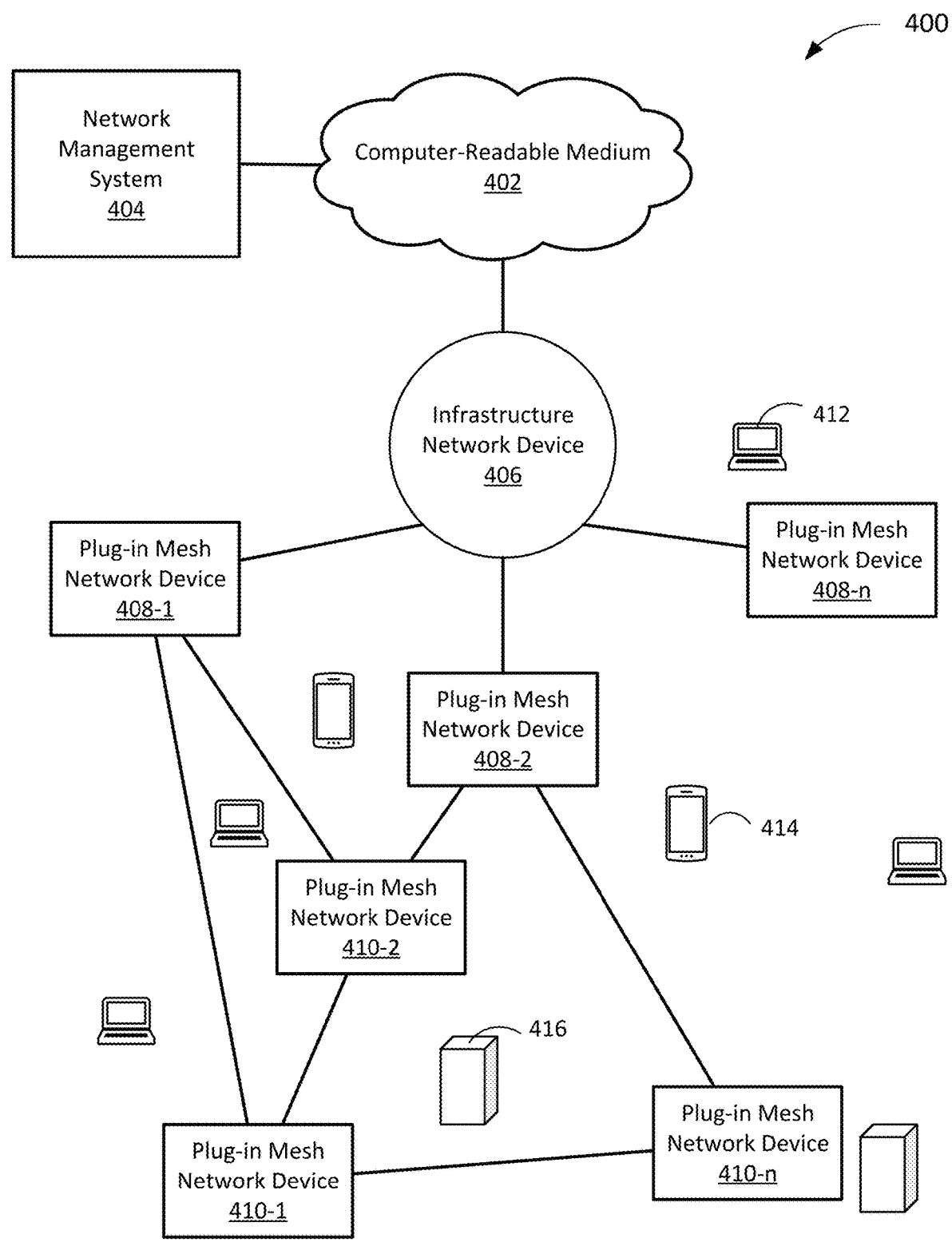
FIG. 4 is a diagram of an example of a network management system with plug-in mesh network devices.

FIG. 4 is a diagram 400 of an example of a network management system with plug-in mesh network devices. In a specific implementation, one or more of the plug-in network devices with adjustable power tongs discussed in this paper can be employed for one or more of the plug-in mesh network devices.

The diagram 400 includes a computer-readable medium 402, a network management system 404 coupled to the computer-readable medium 402, an infrastructure network device 406 coupled to the computer-readable medium 402, plug-in mesh network devices 408-1 to 408-$n$ (hereinafter the "plug-in mesh network devices 408), and optional plug-in mesh network devices 410-1 to 410-$n$ (hereinafter the "optional plug-in mesh network devices 410). The diagram 400 also includes one or more wireless computing devices 412, one or more mobile phones 414, and one or more IoT (internet of things) devices 416, which are intended to represent end-user or edge-of-network devices.

In the example of FIG. 4, the computer-readable medium 402 is intended to represent a variety of potentially applicable technologies. For example, the computer-readable medium 402 can be used to form a network or part of a network. The term "network" can include a number of types of communications networks, such as the Internet, an infrastructure network, or the like. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, one or more other networks can include, for example, a wide area network (WAN), metropolitan area network (MAN), campus area network (CAN), local area network (LAN), personal area network (PAN), but the one or more other networks can at least theoretically be of any size or characterized in some other fashion (e.g., body area network (BAN), near-me area network (NAN), home area network (HAN), vehicle area network (VAN), or Internet area network (IAN), to name a few alternatives).

Networks can include enterprise private networks and virtual private networks (collectively, "private networks"). As the name suggests, private networks are under the control of a single entity. Private networks can include a head office and optional regional offices (collectively, offices). Many offices enable remote users to connect to the private network offices via some other network, such as the Internet. One or more other networks, as described in this paper, may or may not include a private network(s). In specific implementations, networks can be implemented as a WAN, public switched telephone network (PSTN), cellular network, or some other network or combination of similar or different networks capable of coupling two private networks. For illustrative simplicity, the term "enterprise network" is intended to encompass any network or subnet under the control of a single party, regardless of whether the party would be referred to as a "home owner" or a "business."

Where two components are co-located on a device, the computer-readable medium 402 can include a bus or other data conduit or plane. Where a first component is co-located on one device and a second component is located on a different device, the computer-readable medium 402 can include a wireless or wired back-end network or LAN. The computer-readable medium 402 can also encompass a relevant portion of a WAN or other network, if applicable. As used in this paper, a "computer readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 4, the network management system 404 and applicable systems, engines, or devices described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users (e.g., human agents and/or artificial agents) can access the protocols of the cloud-based computing system through a web browser or other container application located on their client device.

A computer system can be implemented as an engine, as part of an engine or through multiple engines. As used in this paper, an engine includes at least two components: 1) a dedicated or shared hardware processor and 2) hardware, firmware, and/or software modules that are executed by the hardware processor. Depending upon implementation-specific or other considerations, an engine can be centralized or its functionality distributed. An engine can include special purpose hardware, firmware, or software embodied in a computer-readable medium for execution by the hardware processor. The hardware processor transforms state into new state using implemented data structures and methods and may include a software processor, but is not intended to represent a software processor sans hardware.

Applicable engines described in this paper, or the engines through which the systems and devices described in this paper can be implemented as cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 4, the network management system 404 is intended to represent a system for managing at least one or more network devices comprising a wireless LAN (WLAN) at a physical location such as a building, one or more floors of a building, an outdoor venue, or the like, which are coupled to a wired backbone of an enterprise network (though the backbone could also be wireless); stations can associate with the WLAN to gain access to services on a network device to which they are coupled or from the backbone through the network device. A wireless network can refer to, by way of example but not limitation, an infrastructure network, an ad hoc network, or some other applicable wireless network. Data on a wireless network is often encrypted, but can be sent in the clear if desired. The stations, network devices, and more generally any device connected to a network, can be referred to as "on" the network.

Depending upon implementation-specific factors, a station can be characterized as a device with a media access control (MAC) address and a physical layer (PHY) interface to a wireless medium that complies with the IEEE 802.11 standards. IEEE 802.11a-1999, IEEE 802.11b-1999, IEEE 802.11g-2003, IEEE 802.11-2007, IEEE 802.11n TGn Draft 8.0 (2009), and IEEE 802.11ac are incorporated by reference. As used in this paper, a system or device that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

Depending upon implementation-specific factors, an AP can be characterized as a network device that is used to enable a wireless communication channel in compliance with the IEEE 802.15 standards such as IEEE 801.15.1 (e.g., Bluetooth), IEEE 801.15.4 (e.g., ZigBee), etc.

Depending upon implementation-specific factors, an AP can be characterized as a network device that is used to enable a communication channel in compliance with the IEEE 802.3 standards. IEEE 802.3 is a working group and a collection of IEEE standards produced by the working group defining the physical layer and data link layer's MAC of wired Ethernet. This is generally a LAN technology with some WAN applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing WLAN computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In the example of FIG. 4, the network management system 404 is intended to represent hardware configured to manage configuration, topology, and/or analytics of one or more WLANs, at least one of which includes the infrastructure network device 406. The network management system 404, or a portion thereof, may be provided through a cloud-based platform, provided through a web server, distributed across multiple devices such as the infrastructure network device 406, or provided through some other mechanism. Accordingly, depending upon implementation- and/or configuration-specific factors, the functionality ascribed to the network management system 404 above could be characterized as being performed by the infrastructure network device 406. In a specific implementation, the network management system 404 is capable of onboarding plug-in network devices, as is discussed in more detail later.

In an alternative, the network management system 404 is configured to establish an admin-designated topology of a WLAN other than mesh topology. The applicable WLAN topology may include daisy chain (ring topology), star topology, line topology, tree topology, fully-connected topology, and combination thereof (and a combination thereof with mesh topology). Thus, there are multiple alternatives to mesh that can take advantage of the techniques described in this paper. It may be noted the plug-in mesh network devices 408 and 410 are referred to as "mesh" because that is what is depicted in the example of FIG. 4, but an appropriate term could be used in place of mesh, depending upon implementation- and/or configuration-specific factors.

The network management system 404, or a portion thereof, may be provided through a cloud-based platform, provided through a web server, distributed across multiple devices such as the infrastructure network device 406, or provided through some other mechanism. Accordingly, depending upon implementation- and/or configuration-specific factors, the functionality ascribed to the network management system 404, or any of it, could be characterized as being performed by the infrastructure network device 406.

In the example of FIG. 4, the infrastructure network device 406 is intended to represent a network device physically present at a location associated with a specific LAN of an enterprise network. The infrastructure network device 406 may be one of multiple network devices (not shown) that are physically present at the location associated with the specific LAN of the enterprise network. The infrastructure network device 406 may be one of multiple different network devices (not shown) that are physically present at multiple different locations associated with respective multiple different specific LANs of the enterprise network. In alternative implementations, the infrastructure network device 406 can be a network device of a HAN or a VAN, and may not be part of an extended service set (ESS) more typical in enterprise networks. It should be understood that enterprise networks can comprise a single basic service set (BSS) and the terms ESS and BSS are implementation-specific, so alternative terms that capture the concept of an extended network with multiple local networks can be used where appropriate.

In a specific implementation, the infrastructure network device 406 includes a WAP that functions as a gateway between a WLAN and a backbone network. The infrastructure network device 406 is intended to represent a device capable of wireless communication with stations within a communication range of the infrastructure network device 406. In an example of operation, a station attempts to authenticate with the infrastructure network device 406. A wireless authentication engine implemented on the infrastructure network device 406 or accessible through the backbone network enables the station to be authenticated, resulting in the station being granted access to one or more services from a service provisioning engine (or one or more service provisioning engines) and the service provisioning engine requires a second authentication process. Alternatively, a sign-on authentication engine can perform the authentication on behalf of the station such that the station must only (from the perspective of the station) authenticate once.

In a specific implementation, the infrastructure network device 406 is provided at a high position such as a ceiling of a room such that wireless signals can be propagated therefrom and received thereby from a location that is generally out-of-the-way, but with advantageous line-of-sight (LOS) and minimal interference from physical objects. For example, in an office floor having a hallway and a plurality of individual offices connected to the hallway, the infrastructure network device 406 is provided at a ceiling of the hallway. In another example, in a home space having a living room around which several bedrooms are located, the infrastructure network device 406 is provided at a high wall position of the living room. In some locations, such as in a vehicle, the height of the infrastructure network device 406 is generally considered to be less consequential. For example, the infrastructure network device 406 would likely be installed in the dashboard area of a vehicle, as opposed to the ceiling, though the higher mount may still be considered sufficiently superior to put the infrastructure network device 406 there.

In a specific implementation, the infrastructure network device 406 is configured to maintain identification information of the infrastructure network device 406, such as serial number and/or MAC address, of the infrastructure network device 406 and unique credential information (e.g., default credential information) for other stations on the network. To establish a wireless connection, stations send credential information of the infrastructure network device 406, and the infrastructure network device 406 compares credential information maintained therein and the credential information received from the stations for authentication. Some network devices can authenticate locally at the network device, while others must pass information through the backbone network for authentication at least in part at an Authentication, Authorization, and Accounting (AAA) server. (e.g., a remote authentication dial-in user service (RADIUS) server). In a RADIUS implementation, network devices often have a RADIUS client component that communicates with the RADIUS server. RFC 2865 (authentication and authorization) and RFC 2866 (accounting) are incorporated herein by reference.

As is illustrated in the diagram 400, the infrastructure network device 406 is coupled to the plug-in mesh network devices 408. Depending on signal intensity of signal generated from the infrastructure network device 406, as well as other factors, the communication range of the infrastructure network device 406 may vary from a few feet to a few hundred feet, but the diagram 400 is not intended to illustrate scale or range. The line connecting the infrastructure network device 406 to the plug-in mesh network devices 408 in the diagram 400 is intended to represent a direct communication link, so the plug-in mesh network devices 408 are assumed to be within range of the infrastructure network device 406 (and any equivalent devices that are not in range or are coupled to the infrastructure network device 406 through a repeater or an indirect communication link are excluded from the plug-in mesh network devices 408).

In the example of FIG. 4, the plug-in mesh network devices 408 are intended to represent network devices capable of extending the reach or range of the infrastructure network device 406 without simply acting as a repeater. For example, the plug-in mesh network devices 408 can have functionality normally attributed to a smart AP, or at least a node that does more than acting solely as a bridge for data passing through it. In a specific implementation, the plug-in mesh network devices 408 are capable of communicating with one another, if within range, through a direct communication link therebetween, though this is not shown in the diagram 400. Alternatively or in addition, the plug-in mesh network devices 408 are capable of communicating with infrastructure network devices (not shown) other than the infrastructure network device 406, and which may be on the same network or subnetwork as the infrastructure network device 406 or on another network and subnetwork.

In a specific implementation, the plug-in mesh network devices 408 are provided at positions lower than the infrastructure network device 406. For example, in an office floor having a hallway and a plurality of individual offices connected to the hallway, the plug-in mesh network devices 408 are located near floor level in individual offices of the office floor. In another example, in a home space having a living room around which several bedrooms are located, the plug-in mesh network devices 408 are located near floor level of the bedrooms. One reason for positioning the plug-in mesh network devices 408 near floor level is that electrical outlets are commonly located near floor level.

In a specific implementation, the plug-in mesh network devices 408 are configured to wirelessly transmit authentication information thereof such that the plug-in mesh network devices 408 are introduced into the WLAN of the infrastructure network device 406. In a specific implementation, the authentication information includes identification information of the plug-in mesh network devices 408, such as serial number and/or MAC address. In a specific implementation, the plug-in mesh network devices 408 are configured to transmit the authentication information in response to applicable triggering events, such as power on (e.g., switch on, plug-in, etc.) of the plug-in mesh network devices 408 and specific user operations of the plug-in mesh network devices 408 (e.g., switching the device to "on," pressing the "done" button in an app, etc.). In a specific implementation, a typical authentication process may be obviated by using a pre-shared key (PSK) known at both ends of the link or SSL (Secure Socket Layer) based on public/private key mechanism, which can improve security by eliminating the need to authenticate wirelessly.

In a specific implementation, the plug-in mesh network devices 408 are configured to maintain identification information of the plug-in mesh network devices 408 (e.g., serial number and/or MAC address) and unique credential information (e.g., default credential information) for stations with which they are in communication in operation. To establish a wireless connection, stations can send credential information, which the plug-in mesh network devices 408 compare to credential information maintained therein for authentication and/or authorization purposes.

In the example of FIG. 4, the optional plug-in mesh network devices 410 are not within range of the infrastructure network device 406 and/or the infrastructure network device 406 is not within range of the optional plug-in mesh network devices 410. Alternatively or in addition, there may be a reason unrelated to range to deny a direct connection between the optional plug-in mesh network devices 410 and the infrastructure network device 406. The optional plug-in mesh network devices 410 can be onboarded in a manner similar to that described above with reference to the plug-in mesh network devices 408, but with an additional hop to reach the network management system 404 (unless, of course, relevant functionality of the network management system 404 is on the plug-in mesh network devices 408, or at least a relevant one of them). The functionality of the plug-in mesh network devices 408 and the optional plug-in mesh network devices 410 may or may not be the same. The optional plug-in mesh network devices 410 are optional because it may be desirable to limit network devices to those that can have a direct wireless connection with the infrastructure network device 406. The optional plug-in mesh network devices 410 could also be replaced with repeaters.

For illustrative purposes, wireless computing devices 412, mobile phones 414, and Internet of Things (IoT) devices 416 are depicted in the diagram 400. These devices are not intended to limit the type of stations that could be on the WLAN associated with the infrastructure network device 406. The wireless computing devices 412 are intended to represent one or more end-node wireless communication devices configured to perform short-range wireless communication, such as personal computers (e.g., desktop computers and laptop computers), tablets, smart watches, game consoles, and so on. The mobile phones 414 are intended to represent one or more end-node wireless communication devices configured to perform long-range wireless communication as well as short-range wireless communication, such as smartphones, tablets, smart watches, and so on, if they are implemented with long-range capabilities. The IoT devices 416 are intended to represent one or more end-node wireless communication devices configured to perform short-range (and sometimes long-range) wireless communication for specific purposes, such as smart speaker, smart thermostat, smart home security device, smart garage opener, smart TV, smart vehicle, smart home appliance, smart wearable devices, and so on. While the diagram 400 does not include lines connecting the wireless computing devices 412, the mobile phones 414, and the IoT devices 416 to the network devices, they are intended to represent stations that will establish wireless links with one or more of the network devices in operation. Because the plug-in mesh network devices 408 and 410 are not simply bridges, it is not necessarily the case that the network management system 404 will prefer that stations authenticate with upstream network devices because downstream network devices may have functionality adequate to reduce upstream traffic, making load balancing more desirable than would typically be the case for a mesh where some nodes are simply repeaters.

Figure 5:
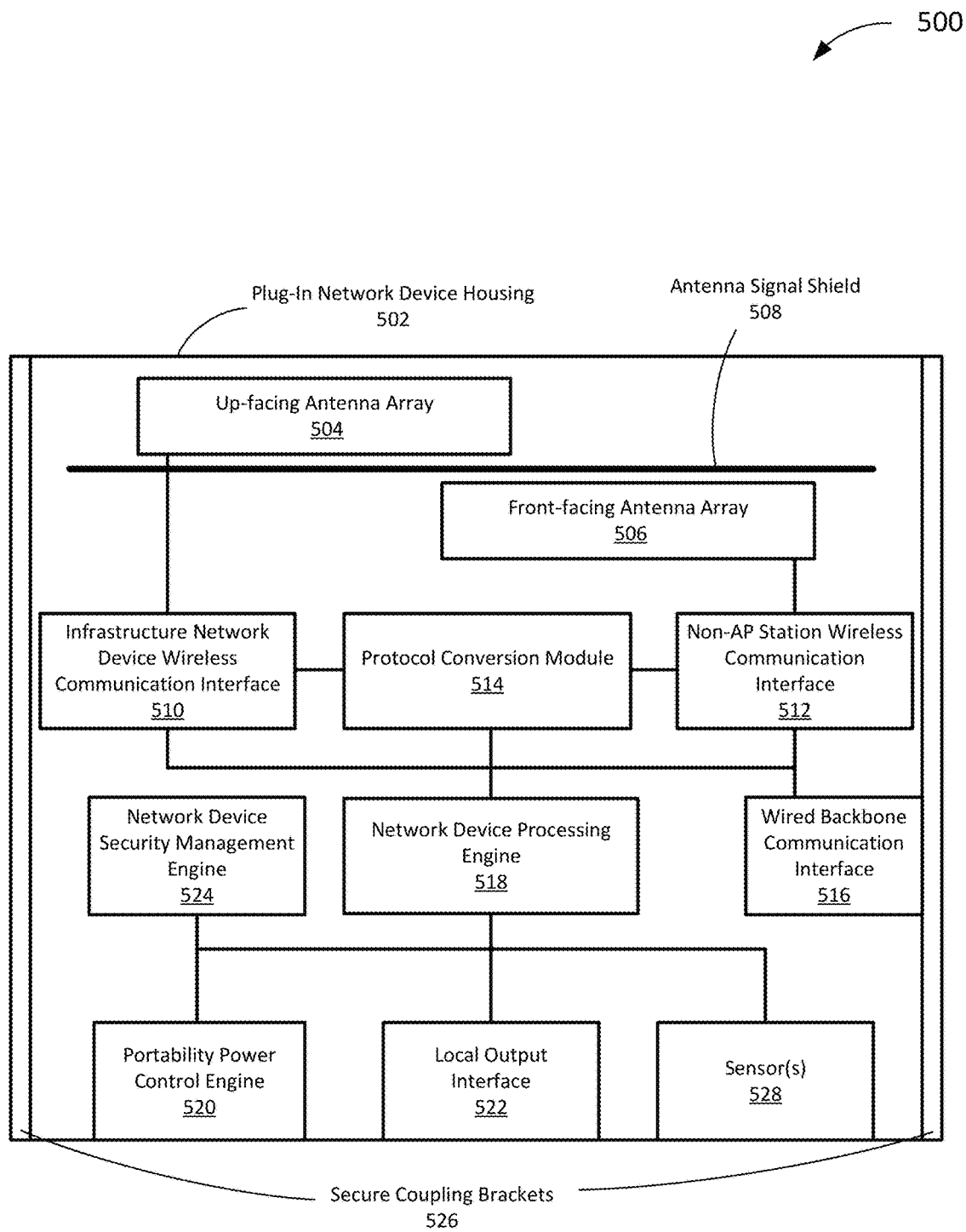
FIG. 5 is a diagram of an example of plug-in network device components.

FIG. 5 is a diagram 500 of an example of plug-in network device components. The diagram 500 includes a plug-in network device housing 502, an up-facing antenna array 504 coupled to the plug-in network device housing 502, a front-facing antenna array 506 coupled to the plug-in network device housing 502, an antenna signal shield 508 coupled to the plug-in network device housing 502 between the up-facing antenna array 504 and the front-facing antenna array 506, an infrastructure network device wireless communication interface 510 coupled to the up-facing antenna array 504, a non-AP wireless communication interface 512 coupled to the front-facing antenna array 506, a protocol conversion module 514 coupled to the infrastructure network device wireless communication interface 510 and the non-AP wireless communication interface 512, a wired backbone communication interface 516 coupled to the protocol conversion module 514, a network device processing engine 518 coupled to the infrastructure network device wireless communication interface 510, the non-AP wireless communication interface 512, the protocol conversion module 514, and the wired backbone communication interface 516, a portability power control engine 520 coupled to the network device processing engine 516, a local output interface 522 coupled to the network device processing engine, a network device security management engine 524 coupled to the network device processing engine 516, and secure coupling brackets 526 coupled to the plug-in network device housing 502.

In the example of FIG. 5, the plug-in network device housing 502 is intended to represent an external body of the plug-in network device. In an alternative, the housing 502 is replaced with a frame or a board, but a housing will be desirable in at least some expected use cases.

In the example of FIG. 5, the up-facing antenna array 504 is intended to represent an array of antennas configured to send wireless signals to and receive wireless signals from an infrastructure network device. In a specific implementation, the up-facing antenna array 504 is provided at a portion of the plug-in network device higher than the front-facing antenna array 506 when the plug-in network device is plugged into an AC power socket (or some other applicable socket). In a specific implementation, the up-facing antenna array 504 is directed upward, which has the advantage of reducing signal interference from wireless activities associated with the front-facing antenna array 506. In a specific implementation, the up-facing antenna array 504 is prevented from transmitting signals downward so as to reduce interference at the front-facing antenna array 506. In a specific implementation, a directivity of wireless signals emitted from the up-facing antenna array 504 is limited to between $\pi/6$ radians and $\pi/2$ radians from horizontal, so as to effectively communicate with an infrastructure network device. ($\pi/2$ radians is assumed to be the upper bound because that is flush with the wall onto which the plug-in network device is presumed to be affixed, but the upward bound would likely increase to $5\pi/6$ radians if there were no wall, which is similar to saying above panoramic $7\pi/6$ radians above horizontal.)

In the example of FIG. 5, the front-facing antenna array 506 is intended to represent an array of antennas configured to send wireless signals to and receive wireless signals from non-AP stations. In an alternative, the front-facing antenna array 506 can also send wireless signals to and receive wireless signals from other plug-in network devices. In a specific implementation, the front-facing antenna array 506 is provided at a portion of the plug-in network device lower than the up-facing antenna array 504 when the plug-in network device is plugged into an AC power socket (or some other applicable socket). In a specific implementation, the front-facing antenna array 506 is directed frontward (e.g., roughly parallel to the ground in a typical installation), which has the advantage of reducing signal interference from wireless activities associated with the up-facing antenna array 504. In a specific implementation, the front-facing antenna array 506 is prevented from transmitting signals upward so as to reduce interference at the up-facing antenna array 504. In a specific implementation, a directivity of wireless signals emitted from the front-facing antenna array 504 is limited to between $\pi/6$ radians and $-\pi/2$ radians from horizontal, so as to effectively communicate with non-AP stations or, if applicable, other plug-in network devices. ($-\pi/2$ radians is assumed to be the lower bound because that is flush with the wall onto which the plug-in network device is presumed to be affixed, but the lower bound would likely decrease to $-7\pi/6$ radians if there were no wall, which is similar to saying below panoramic $\pi/6$ radians above horizontal.)

In the example of FIG. 5, the antenna signal shield 508 is intended to represent a signal shield member configured to shield the up-facing antenna array 504 from electromagnetic (EM) interference associated with the front-facing antenna array 506, and vice versa. The antenna signal shield 508 can also be characterized as a radio frequency (RF) shield. In a specific implementation, the antenna signal shield 508 is configured to absorb or reflect EM radiation emitted from the up-facing antenna array 504, such that received signal strength (RSS) at the front-facing antenna array 506 is reduced or, ideally, the signals are not detected at all. In a specific implementation, the antenna signal shield 508 is configured to absorb or reflect EM radiation emitted from the front-facing antenna array 506, such that the RSS at the up-facing antenna array 504 is reduced or, ideally, the signals are not detected at all. In a specific implementation, the antenna signal shield 508 is provided between the up-facing antenna array 504 and the front-facing antenna array 506 and extends in a roughly horizontal plane along the entire longitudinal side of the up-facing antenna array 504 and the entire longitudinal side of the front-facing antenna array 506. In a specific implementation, the antenna signal shield 508 is formed of a metal plate and/or a metal mesh having mesh size smaller than wavelengths of the wireless signals to be shielded. Examples of metal that can be used to form the antenna signal shield 508 include copper and/or nickel.

In the example of FIG. 5, the infrastructure network device wireless communication interface 510 is intended to represent a signal processing module (e.g., circuitry) configured to process signals received from the up-facing antenna array 504 into signals to be internally processed in the plug-in network device and generate signals to be propagated from the up-facing antenna array 504. Depending on a specific implementation, the infrastructure network device wireless communication interface 510 includes applicable circuit elements such as an amplifier, a phase shifter, a signal modulator, an analog-to-digital (AD) converter, and a digital-to-analog (DA) converter. For example, when the infrastructure network device wireless communication interface 510 receives wireless signals from the up-facing antenna array 504, the infrastructure network device wireless communication interface 510 generates a digital bit signal from the received wireless signals and provides to the protocol conversion module 514. In another example, when the infrastructure network device wireless communication interface 510 receives digital bit wireless signals from the protocol conversion module 514, the infrastructure network device wireless communication interface 510 generates an analog signal to be propagated from the up-facing antenna array 504.

In the example of FIG. 5, the non-AP station wireless communication interface 512 is intended to represent a signal processing module (e.g., circuitry) configured to process signals received from the front-facing antenna array 506 into signals to be internally processed in the plug-in network device and generate signals to be propagated from the front-facing antenna array 506. In a specific implementation, the non-AP station wireless communication interface 512 includes the same or similar circuit elements as the infrastructure network device wireless communication interface 510 and performs the same or similar signal processing, but for non-AP station communications instead of infrastructure network device communications. The term "non-AP station wireless communication interface" is intended to be short for "non-AP station and plug-in network device wireless communication interface" in an implementation that includes other plug-in network devices with which the plug-in network device depicted in the example of FIG. 5 can directly communicate.

In the example of FIG. 5, the protocol conversion module 514 is intended to represent circuitry for converting a signal from a first wireless communication protocol to a second wireless communication protocol. For example, a wireless communication protocol associated with the up-facing antenna array 504 may be different from a wireless communication protocol associated with the front-facing antenna array 506. In a specific implementation, the protocol conversion module 514 is configured to convert a signal compliant with a first IEEE 801.11 standard (e.g., IEEE 801.11b/g) to a signal compliant with a second IEEE 801.11 standard (e.g., IEEE 801.11ac), from 802.11 to 802.15, or to and from some other collection of protocols. Advantageously, the wireless communication protocol of wireless signals transmitted and received by the up-facing antenna array 504 can conform to a first protocol with a transmission rate that is lower than that of a second protocol associated with the front-facing antenna array 506, which can improve the overall performance of the WLAN. In a specific implementation, when the protocol conversion module 514 converts to a protocol, the protocol conversion module 514 is configured to convert (down-convert and/or up-convert) a frequency of the wireless signals. For example, when the protocol conversion module 514 converts from IEEE 801.11b/g to IEEE 801.11ac, the protocol conversion module 514 upconverts the frequency to 2.4 GHz to 5.0 GHz.

In a specific implementation, the protocol conversion module 514 is configured to convert a wire-based communication protocol employed by a wire-based communication through the wired backbone communication interface 516 to a wireless communication protocol for wireless communication through the up-facing antenna array 504 and/or the front-facing antenna array 506. For example, the wire-based communication can be compliant with the IEEE 802.3 standards.

In the example of FIG. 5, the wired backbone communication interface 516 is intended to represent circuitry for processing signals received through wires into signals to be internally processed in the plug-in network device and generate signals to be transmitted through antennas. In a specific implementation, the wired backbone communication interface 516 includes the same or similar circuit elements as the infrastructure network device wireless communication interface 510 and/or the non-AP station wireless communication interface 512, and performs the same or similar signal processing.

In the example of FIG. 5, the network device processing engine 518 is intended to represent a processing module configured to control the entire operation of the plug-in network device. In a specific implementation, the network device processing engine 518 drives the infrastructure network device wireless communication interface 510, the non-AP station wireless communication interface 512, and the wired backbone communication interface 568 to perform signal processing. In a specific implementation, the network device processing engine 518 causes the protocol conversion module 514 to perform protocol conversion as discussed above. In a specific implementation, the network device processing engine 518 causes the portability power control engine 520, the local output interface 522, and the network device security management engine 524 to perform their respective operations as discussed below.

In a specific implementation, the network device processing engine 518 is also configured to serve as a buffer. For example, when wireless communication is carried out via the up-facing antenna array 504 and the front-facing antenna array 506, via the up-facing antenna array 504 and the wired backbone communication interface 516, and via the front-facing antenna array 506 and the wired backbone communication interface 516, the network device processing engine 516 buffers datasets that are not yet ready to be transmitted therein. In another example, when data communication is carried out between and infrastructure network device and some other plug-in network devices or non-AP station, the network device processing engine 518 buffers datasets that are not yet ready to be transmitted.

In the example of FIG. 5, the portability power control engine 520 is intended to represent circuitry for controlling power supply to the plug-in network device. In a specific implementation, the portability power control engine 520 is configured to supply power to electronic components of the plug-in network device. In a specific implementation, the portability power control engine 520 is connectable to an electrical socket or any other applicable connector (e.g. USB, cigarette lighter receptacle, etc.) to receive power from an external power source (e.g., an electrical grid). In a specific implementation, the portability power control engine 520 is configured to store power therein. For example, the portability power control engine 520 is configured to accommodate non-detachable and/or detachable power storage or capacitance. In a specific implementation, the non-detachable power storage includes rechargeable battery, capacitors, or photovoltaic cells, to name a few. In a specific implementation, the detachable power storage includes rechargeable battery, non-rechargeable battery, or photovoltaic cells, to name a few. In a specific implementation, the portability power control engine 520 is configured to also supply power stored in power storage out of the plug-in network device, for example, to one or more stations, such as via a USB Type-C connector.

In the example of FIG. 5, the local output interface 522 is intended to represent circuitry for generating a notification output for applicable purposes. In a specific implementation, the notification output is light, a sound, an image, a multimedia stream, or a signal triggering one or more of these, to name several possibilities. In a specific implementation, the notification output is associated with an operational and/or connection state of the plug-in network device. In a specific implementation, the notification output can be for events that have nothing to do with the state of the plug-in network device, such as a tardy bell in a school, the location of a triggered motion sensor, or the like.

In the example of FIG. 5, the network device security management engine 524 is intended to represent circuitry for managing an authentication process of the plug-in network device for connection with stations and/or an authentication processes. In a specific implementation, the network device security management engine 524 is configured to cause the up-facing antenna array 504 (and maybe also the front-facing antenna array 506) to transmit authentication information of the plug-in network device, such that the plug-in network device is introduced into a WLAN when deployed. In a specific implementation, the authentication information includes identification information of the plug-in network device, such as serial number and/or MAC address. In a specific implementation, the network device security management engine 524 is configured to cause the up-facing antenna array 504 (and may be also the front-facing antenna array 506) to transmit the authentication information in response to applicable triggering events, such as power supply (e.g., switch on, plug-in, etc.) from the portability power control engine 520 and specific user operations of the plug-in network device.

In a specific implementation, the plug-in security management engine 524 is configured to maintain identification information of the plug-in network device, such as serial number and/or MAC address, of the plug-in network device and unique credential information (e.g., default credential information) for other stations. In a specific implementation, the network security management engine 524 is configured to assist in establishing a wireless connection with other stations. To establish the secure wireless connection, stations send credential information, which the network device security management engine 524 compares to credential information maintained therein or that can be provided to the network device security management engine 524 through an infrastructure network device.

In the example of FIG. 5, the secure coupling brackets 526 are intended to represent one or more mechanical, magnetic, and/or electrical modules employed to secure coupling of the plug-in network device to a predetermined position (e.g., an AC power socket on a wall). In a specific implementation, the secure coupling brackets 526 include one or more openings (e.g., holes) to receive fasteners such as screws or nails. In a specific implementation, the secure coupling brackets 526 are detachably coupled to the plug-in network device housing 502. Advantageously, especially where the plug-in network device receives power from external sources, it is desirable to prevent the plug-in network device from being inadvertently disconnected from the power supply. Even relatively flimsy secure coupling brackets 526 should signal to a human that the plug-in network device should not be unplugged, so there is no explicit requirement that the secure coupling brackets 526 be exceptionally robust, unless such an implementation is necessitated by factors that are atypical in a home or office installation.

In the example of FIG. 5, the sensor(s) 528 is intended to represent various applicable sensors such as a global positioning sensor (GPS), an accelerometer, a gyrometer, a motion sensor, a vibration sensor, a smell sensor (e.g., alcohol sensor), a sound (including ultrasonic) sensor, a thermometer, a hygrometer, a smoke detector, and so on. In a specific implementation, when the sensor(s) 528 detect an abnormal state, the sensor(s) 528 transmit an abnormality notification to the network device processing engine 518, such that the network device processing engine 518 uses the infrastructure network device wireless communication interface 510 to transmit the abnormality notification over the up-facing antenna array 504. In a specific implementation, the abnormality notification is transmitted to a network management system (for alerting an admin or other responsible party) and/or applicable entities (e.g., police, fire department, highway patrol, coast guard, aviation administration, amber alert, etc.).

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A plug-in network device, comprising:
a plug attachment;
a power plug extending from the plug attachment;
adjustable power tongs;
a rear side having a rear housing;
an engagement mechanism disposed on the rear housing, the engagement mechanism including a latch structure configured to removably fix a front housing to the rear housing;
a front side having the front housing;
a fastening mechanism configured to:
 fasten the power plug to the adjustable power tongs; and
 fasten the plug attachment to the rear housing;
a plug attachment cover operationally connected to the adjustable power tongs, wherein the plug attachment cover comprises an earth terminal, a fuse in a recessed portion of the plug attachment cover, and a fuse cover that covers the recessed portion; and
electronic components disposed in the rear housing or the front housing that receive power via the power plug from a power source causing the plug-in network device to function as a wireless access point (WAP).

2. The plug-in network device of claim 1, wherein a length and a width of the plug-in network device is between 50-80 mm, and a depth of the plug-in network device is between 20-45 mm.

3. The plug-in network device of claim 1, wherein the plug attachment is configurable for use in a plurality of geographic regions using the power plug corresponding to a geographic region of the plurality of geographic regions.

4. The plug-in network device of claim 1, wherein the rear housing is a substantially cuboid rear housing.

5. The plug-in network device of claim 1, further comprising one or more status indicators coupled to the electronic components, the one or more status indicators indicating an operational status of the plug-in network device, a connection status of the plug-in network device, or a combination thereof.

6. The plug-in network device of claim 1, wherein the plug attachment and the plug attachment cover define outer surfaces of an attachment unit to be attached to a main body of the plug-in network device.

7. The plug-in network device of claim 1, wherein the power plug includes an alternating current (AC) power plug.

8. The plug-in network device of claim 1, further comprising an internal battery coupled to the electronic components to allow the plug-in network device to continue to operate as a WAP in response to the power plug being disconnected from the power source.

9. The plug-in network device of claim 1, further comprising a slot for a connector that provides data, power, or a combination thereof.

10. A system, comprising:
a network management system that includes hardware configured to manage a wireless local area network (WLAN) at a physical location;
an infrastructure network device on the WLAN coupled to the network management system;
a plug-in network device, coupled to the infrastructure network device via a wireless medium, the plug-in network device comprising:
a plug attachment;
a power plug extending from the plug attachment;
adjustable power tongs;
a rear side having a rear housing;
an engagement mechanism disposed on the rear housing, the engagement mechanism including a latch structure configured to removably fix a front housing to the rear housing;
a front side having the front housing;
a fastening mechanism configured to:
 fasten the power plug to the adjustable power tongs; and
 fasten the plug attachment to the rear housing;
a plug attachment cover operationally connected to the adjustable power tongs, wherein the plug attachment cover comprises an earth terminal, a fuse in a recessed portion of the plug attachment cover, and a fuse cover that covers the recessed portion; and
electronic components configured to receive power via the power plug from a power source causing the plug-in network device to function as a wireless access point (WAP).

11. The system of claim 10, wherein a length and a width of the plug-in network device is between 50-80 mm, and a depth of the plug-in network device is between 20-45 mm.

12. The system of claim 10, wherein the plug attachment of the plug-in network device is configurable for use in a plurality of geographic regions using the power plug corresponding to a geographic region of the plurality of geographic regions.

13. The system of claim 10, wherein the plug-in network device further comprises one or more status indicators coupled to the electronic components, the one or more status indicators indicating an operational status of the plug-in network device, a connection status of the plug-in network device, or a combination thereof.

14. The system of claim 10, wherein the rear housing is a substantially cuboid rear housing.

15. The system of claim 10, wherein the plug attachment and the plug attachment cover of the plug-in network device define outer surfaces of an attachment unit to be attached to a main body of the plug-in network device.

16. The system of claim 10, wherein the power plug of the plug-in network device includes an alternating current (AC) power plug.

17. The system of claim 10, wherein the plug-in network device further comprises an internal battery coupled to the electronic components to allow the plug-in network device to continue to operate as a WAP upon disconnection of the power plug from the power source.

18. The system of claim 10, wherein the plug-in network device further comprises a slot for a connector that provides data.

* * * * *